US005692124A

United States Patent [19]
Holden et al.

[11] Patent Number: 5,692,124
[45] Date of Patent: Nov. 25, 1997

[54] SUPPORT OF LIMITED WRITE DOWNS THROUGH TRUSTWORTHY PREDICTIONS IN MULTILEVEL SECURITY OF COMPUTER NETWORK COMMUNICATIONS

[75] Inventors: James M. Holden, Valley Center; Stephen E. Levin, Poway; Edwin H. Wrench, Jr., San Diego, all of Calif.

[73] Assignee: ITT Industries, Inc., White Plains, N.Y.

[21] Appl. No.: 704,896

[22] Filed: Aug. 30, 1996

[51] Int. Cl.⁶ .............................. H04L 9/00; G06F 12/14; G06F 17/30
[52] U.S. Cl. .............. 395/187.01; 395/186; 395/187.01; 395/200.06; 395/609
[58] Field of Search .......................... 395/186, 187.01, 395/200.06, 609; 364/286.4, 222.5

[56] References Cited

U.S. PATENT DOCUMENTS

| | | | |
|---|---|---|---|
| 4,984,272 | 1/1991 | McIlroy et al. | 364/222.5 |
| 5,204,961 | 4/1993 | Barlow | 395/187.01 |
| 5,355,474 | 10/1994 | Thrasaisingham et al. | 395/609 |
| 5,469,556 | 11/1995 | Clifton | 395/186 |
| 5,469,569 | 11/1995 | Grube et al. | 364/286.4 |
| 5,574,912 | 11/1996 | Hu et al. | 364/222.5 |

OTHER PUBLICATIONS

Browne, R. "An Architecture for Covert Channel Control in Real Time Networks and Multiprocessors," 1995 IEEE Symposium on Security and Privacy, May 1995, pp. 155–168.

Thomas et al., "A Trusted Subject Architecture for Multi-level Secure Object-Oriented Databases," IEEE Transactions on Knowledge and Data Engineering, vol. 8, No. 1, pp. 16–31, Feb. 1996.
Keefe et al., "Multilevel Secure Database Concurrency Control," Sixth International Conference on Data Engineering, pp. 337–344, 1990.
Venkatraman et al., "Transmission Schedules to Prevent Traffic Analysis," Computer Security Application conference, pp. 108–115, 1993.
Mathur et al., "The Concurrency Control and Recovery Problem for Multilevel Update Transactions in MLS Systems," 1993 Computer Security Foundation Workshops VI, pp. 10–23, 1993.

*Primary Examiner*—Robert W. Beausoliel, Jr.
*Assistant Examiner*—Luan C. Do
*Attorney, Agent, or Firm*—Plevy & Associates

[57] ABSTRACT

A method is disclosed for limited write downs of data from higher security classification users to lower security classification users across computer networks, while preserving the security of classified data at the higher security classification user from covert transmission via acknowledgment messages from the higher user to the lower user. The intended acknowledgment message is released to the lower user when it matches the user content of a predicted acknowledgment message. In TCP/IP interface applications, the acknowledgment messages are IP based data transfer protocols acknowledging the transfer of data from the lower side to the higher side. With IP datagram transfers, deterministic portions are predicted and non-deterministic portions are identified. Where the number of non-deterministic bits exceed a predetermined rate, the acknowledgment message is discarded.

23 Claims, 5 Drawing Sheets

FIG. 4

| 0 | 8 | 16 | 24 | 31 |
|---|---|---|---|---|
| HARDWARE TYPE | | PROTOCOL TYPE | | |
| HLEN | PLEN | OPERATION | | |
| SENDER'S HA (bytes 0-3) | | | | |
| SENDER'S HA (bytes 4-5) | | SENDER'S IP (bytes 0-1) | | |
| SENDER'S IP (bytes 2-3) | | TARGET'S HA (bytes 0-1) | | |
| TARGET'S HA (bytes 2-5) | | | | |
| TARGET'S IP (bytes 0-4) | | | | |

FIG. 5

| 0 | 8 | 16 | 24 | 31 |
|---|---|---|---|---|
| NEXT | | | | |
| PREVIOUS | | | | |
| IP ADDRESS | | | | |
| PEER SNTU IP ADDRESS | | | | |
| ASSOCIATION KEY POINTER | | | | |
| RELEASE KEY POINTER | | | | |
| ASSOC-TYPE | RELKEY-TYPE | SECURITY-LEVEL | SPARE | |

FIG. 6

| 0 | 8 | 16 | 24 | 31 |
|---|---|---|---|---|
| NEXT | | | | |
| PREVIOUS | | | | |
| DISTINGUISHED NAME (bytes 0-3) | | | | |
| . . . | | | | |
| DISTINGUISHED NAME (bytes 28-31) | | | | |
| MEK (bytes 0-3) | | | | |
| MEK (bytes 4-7) | | | | |
| MEK (bytes 8-11) | | | | |
| IV (bytes 0-3) | | | | |
| IV (bytes 4-7) | | | | |
| IV (bytes 8-11) | | | | |
| IV (bytes 12-15) | | | | |
| IV (bytes 16-19) | | | | |
| IV (bytes 20-23) | | | | |
| CERTIFICATE POINTER | | | | |
| INDEX | | SPARE | | SPARE |

SUPPORT OF LIMITED WRITE DOWNS THROUGH TRUSTWORTHY PREDICTIONS IN MULTILEVEL SECURITY OF COMPUTER NETWORK COMMUNICATIONS

RELATED APPLICATIONS

The Assignee herein, ITT Corporation, is the record owner of related U.S. Pat. No. 5,577,209 (issued Nov. 19, 1996), (U.S. application Ser. No. 08/270,398) to Boyle et al., entitled APPARATUS AND METHOD FOR PROVIDING MULTI-LEVEL SECURITY FOR COMMUNICATION AMONG COMPUTERS AND TERMINALS ON A NETWORK, filed Jul. 5, 1994.

FIELD OF THE INVENTION

The present invention relates in general to secure and multi-level secure (MLS) networks and in particular to a system and method for providing limited write downs of data from higher to lower security classification users.

BACKGROUND OF THE INVENTION

Multi-level secure (MLS) networks provide a means of transmitting data of different classification levels (i.e. Unclassified, Confidential, Secret and Top Secret) over the same physical network. To be secure, the network must provide the following security functions: data integrity protection, separation of data types, access control, authentication and user identification and accountability.

Data integrity protection ensures that data sent to a terminal is not modified enroute. Header information and security level are also protected against uninvited modification. Data integrity protection can be performed by check sum routines or through transformation of data, which includes private key encryption and public key encryption.

Separation of data types controls the ability of a user to send or receive certain types of data. Data types can include voice, video, E-Mail, etc. For instance, a host might not be able to handle video data, and, therefore, the separation function would prevent the host from receiving video data.

Access control restricts communication to and from a host. In rule based access control, access is determined by the system assigned security attributes. For instance, only a user having Secret or Top Secret security clearance might be allowed access to classified information. In identity based access control, access is determined by user-defined attributes. For instance, access may be denied if the user is not identified as an authorized participant on a particular project. For control of network assets, a user may be denied access to certain elements of the network. For instance, a user might be denied access to a modem, or to a data link, or to communication on a path from one address to another address.

Identification of a user can be accomplished by a unique name, password, retina scan, smart card or even a key for the host. Accountability ensures that a specific user is accountable for particular actions. Once a user establishes a network connection, it may be desirable that the user's activities be audited such that a "trail" is created. If the user's actions do not conform to a set of norms, the connection may be terminated.

Currently, there are three general approaches to providing security for a network: trusted networks, trusted hosts with trusted protocols, and encryption devices. The trusted network provides security by placing security measures within the configuration of the network. In general, the trusted network requires that existing protocols and, in some cases, physical elements be replaced with secure systems. In the Boeing MLS LAN, for instance, the backbone cabling is replaced by optical fiber and all access to the backbone is mediated by security devices. In the Verdix VSLAN, similar security devices are used to interface to the network, and the network uses encryption instead of fiber optics to protect the security of information transmitted between devices. VSLAN is limited to users on a local area network (LAN) as is the Boeing MLS LAN.

Trusted hosts are host computers that provide security for a network by reviewing and controlling the transmission of all data on the network. For example, the U.S. National Security Agency (NSA) has initiated a program called Secure Data Network System (SDNS) which seeks to implement a secure protocol for trusted hosts. In order to implement this approach, the installed base of existing host computers must be upgraded to run the secure protocol. Such systems operate at the Network or Transport Layers (Layers 3 or 4) of the Open Systems Interconnection (OSI) model.

Encryption devices are used in a network environment to protect the confidentiality of information. They may also be used for separation of data types or classification levels. Packet encryptors or end-to-end encryption (EEE) devices, for instance, utilize different keys and labels in protocol headers to assure the protection of data. However, these protocols lack user accountability since they do not identify which user of the host is using the network, nor are they capable of preventing certain users from accessing the network. EEE devices typically operate at the Network Layer (Layer 3) of the OSI model. There is a government effort to develop cryptographic protocols which operate at other protocol layers.

An area of growing concern in network security is the use of computer devices in non-secure networks. Such computer devices often include valuable information, which may be lost or stolen due to these computers being accessed through the non-secured network. In light of this problem, a number of related products have been developed. The products developed include Raptor Eagle, Raptor Remote, Entrust, Secret Agent and Veil. Although, these products serve the same purpose, a number of different approaches have been utilized. For example, Raptor Eagle, Raptor Remote, and Veil implement these products as software instantiations. While Entrust and Secret Agent utilize hardware cryptographic components. Additionally, Raptor products are also application independent.

A problem with the above described products is that none are based upon the use of highly trusted software. Veil is an off-line encryption utility, which cannot prevent the inadvertent release of un-encrypted information. While Raptor Eagle and Raptor Remote are based on software instantiations and thus cannot be verified at the same level of assurance. Secret Agent and Entrust while hardware based are dependant upon the development of integration software for specific applications.

Another matter of concern with existing network security devices is the potential for unauthorized and covert write downs, i.e., the transfer of information from a device with a high level classification to a device with a lower level classification. Department of Defense (DOD) security policy does not restrict the movement of data from a lower to a higher security classification device, i.e., a write up from an unclassified host to a secret host. However, most transfer protocols require acknowledge or feedback messages to confirm the transfers. These feedback messages could be used to covertly send information from the higher to the lower host by faking the source address or protocol identification code fields of the message, i.e., inserting secret data in the address or code fields. Such write downs are explicit violations of security policy.

Accordingly, it is an object of the present invention to support limited write downs from higher level classification devices or networks to lower classification devices or networks, and provide assurance that these write downs cannot be used to violate security policy. More particularly, it is an object of the present invention to allow a limited subset of the required knowledge and feedback messages needed to support write ups without allowing the transmission of higher classification data to a lower level classification device or network.

SUMMARY OF THE INVENTION

In accordance with the present method, limited write downs of data from a higher security classification level to a lower security classification level, across a computer network, are performed so as to maintain the security of classified data residing at the higher level from covert transference in network protocol feedback or acknowledgment messages from the higher security level. More specifically, classified data residing at a lower security classification level is sent with delivery information, such as IP address protocol information, to a higher security classification level. The intended acknowledgment message for confirming receipt of the data at the higher security classification level is matched against user content of predicted permissible acknowledgment messages. When the intended and the predicted acknowledgment message match sufficiently, the intended acknowledgment message is released. The present method for limited write downs is also applicable to trivial file transfer protocols (TFTP) for blocks of data. Where Internet protocol (IP) datagrams are transferred from the low security level to the high security level, the preferred method is to predict deterministic data and identify non-deterministic data which includes IP addresses. The confirmation message back to the low security level is monitored for the number of non-deterministic bits. Intended confirmation messages having a number of non-deterministic bits exceeding a predetermined rate are discarded, and not sent back to the lower security level.

BRIEF DESCRIPTION OF THE DRAWINGS

The invention will be better understood with reference to the following illustrative and non-limiting drawings, in which:

FIG. 4 is a table showing the format for the Address Resolution Protocol and Reverse Address Resolution Protocol messages in accordance with the present invention;

FIG. 5 is a table showing the data structure for a token of the Association Table in accordance with the present invention; and FIG. 6 is a table showing the data structure of a token for the Sym_Key Table in accordance with the present invention.

DETAILED DESCRIPTION OF THE INVENTION

Figure 1:
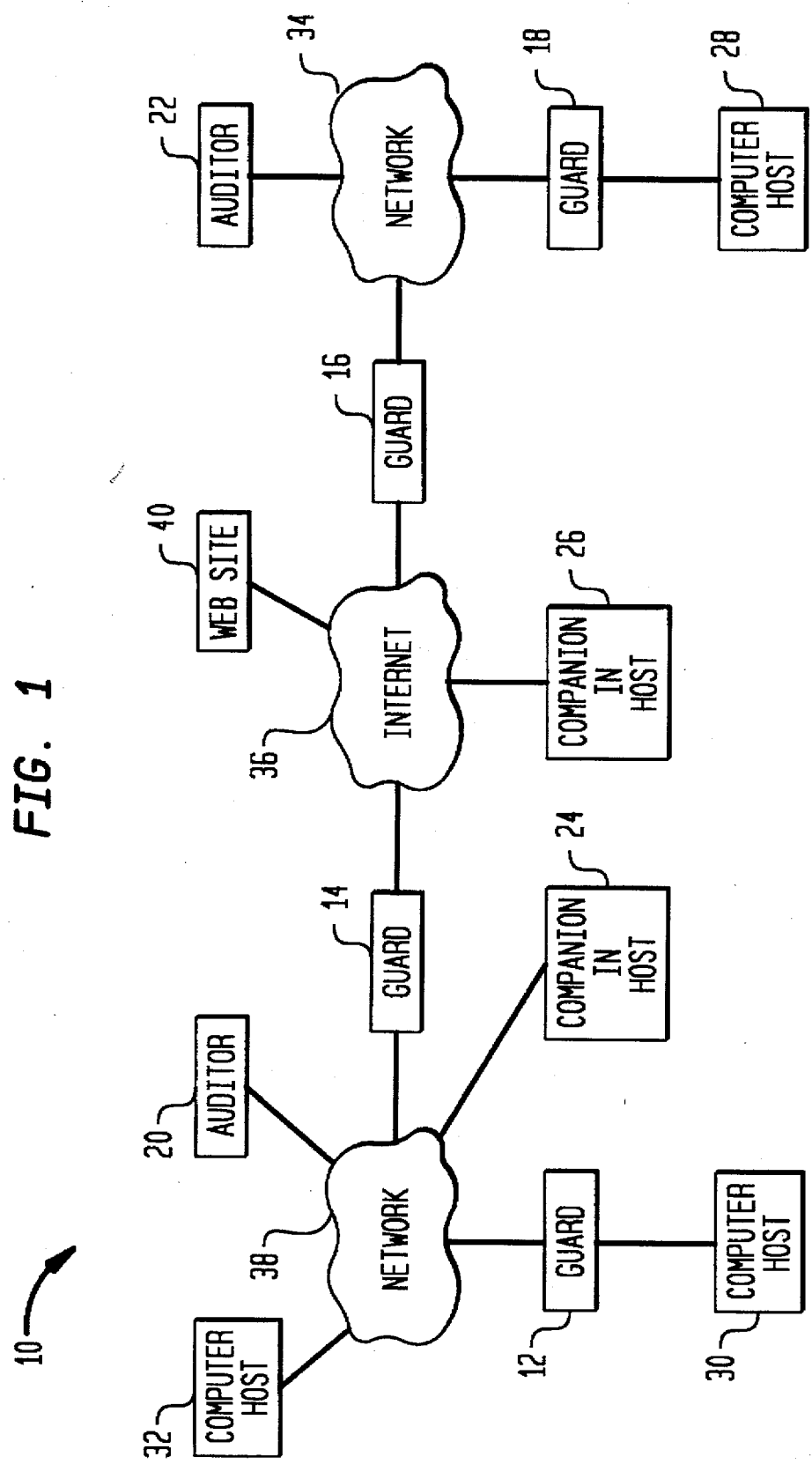
FIG. 1 is a schematic diagram of an MLS network system in accordance with the present invention.

The present invention is directed to a secure network interface unit (SNIU), which is utilized to control communications between a user such as a computer host and a network at a "session layer" of interconnection which occurs when a user on the network is identified and a communication session is to commence. For example, the industry-standard Open Systems Interconnection (OSI) model, defines seven layers of a network connection: (1) physical; (2) data link; (3) network; (4) transport; (5) session; (6) presentation; and (7) application.

In the present invention, the network security measures are implemented at the network, transport, and session layers, i.e., layers 3 to 5. The SNIU intercepts Internet protocol (IP) datagrams at the network layer as they are transmitted between the user and the network. The SNIU determines whether each datagram from the user is releasable to the network and if and how it should be encrypted. The SNIU decrypts each datagram from the network and determines whether it is releasable to the user. The method for limited secure write downs is implemented at the transport layer. When a SNIU releases a datagram from a lower classification user or network to a higher classification user or network, i.e., a write up, the datagram is used to predict the expected response. When a datagram is received from the higher classification user or network, the SNIU compares the datagram to the response which was predicted during the write up and, if they match, releases it, i.e., allows the write down, to the lower classification user or network. The SNIU implements a custom Trusted Session Protocol (TSP) to establish associations, described herein after, at the session layer prior to permitting any communication between a user and a network. The TSP authenticates users, exchanges security parameters between SNIUs, and establishes encryption keys for an association. This method of providing security allows existing network assets and existing network protocols to continue to be used, thereby avoiding the need to replace an installed network base for implementation of the multi-level security system.

The connected host or user equipment and the network backbone are therefore not required to be secure (trusted). Conventionally, OSI network applications employ CCITT X.215 which is a non-secure session layer protocol. None of the prior multi-level security systems employ the security measures described herein in the Session Layer.

The SNIU according to the present invention can be configured in a number of different embodiments depending on the particular physical locations and forms of implementation. These embodiments include a stand alone hardware SNIU and a software SNIU.

The hardware embodiment of the SNIU is implemented solely as a stand alone hardware device. Such a configuration is desirable, since the stand alone SNIU is highly trusted. The stand alone SNIU is configured to be inserted between existing hosts and a network. The SNIU is transparent to the host, and any legacy system or application software running on the host. The stand alone SNIU provides protection for any host connected to an IP based network. There is no requirement that the attached host computers run a trusted operating system. The stand alone SNIU provides a trusted boundary between the protected hosts and the unprotected network. Protected means that the connection is with another known SNIU (a unique digital signature identifies the SNIU), the messages are confidential (encrypted) and unaltered (cryptographic residues validate the packet).

The software embodiment of the SNIU is implemented primarily as a software function resident in and executed from the host machine. The only hardware required is a commercially available cryptographic card, e.g., a Fortezza card, which plugs into the host computer's PCMCIA card reader. Such a configuration is desirable, since the software SNIU is designed to be installed in existing portable computers, which avoids the additional cost of additional hardware required by a stand alone hardware SNIU. The software SNIU provides the same network security features as the stand alone SNIU when the host computer is connected to home enterprise's network. The software SNIU also extends that same level of security across the Internet (or any other unprotected network) when the user is on the road and is remotely communicating with the enterprise network or other remotely located computer devices including a similar software SNIU.

The software SNIU provides all of the functionality and security of the stand alone SNIU as well as complete operability with these devices. The software comprising the software SNIU is based on the same software utilized in the stand alone hardware SNIU. The user of the software SNIU assumes an acceptable risk in exchange for not requiring additional hardware required by a stand alone SNIU, which cannot be circumvented or corrupted via attacks originating from external hardware. By providing reasonable software protection (not allowing unauthorized personnel physical access) and software protection (anti-virus protection), a software SNIU can be utilized providing the user with an acceptable level of risk. If the user is confident that the software comprising the software SNIU is not circumvented or modified, then he can enjoy the same degree of confidence as the user of a stand alone device.

Referring to FIG. 1, there is shown an example of a Multi-Level Security (MLS) System in accordance with the present invention. This system 10 incorporates the various embodiments of the SNIUs in order to provide MLS for computer networks such as the Internet. For example, the guard devices 14, 16 which are hardware embodiments of the SNIU are coupled between computer networks 34,36,38 providing inter-network security. Additional guard devices 12, 18 are coupled between users such as computer hosts 28 and 30, and the respective networks 34 and 38. The software embodiment of the SNIUs are implemented as a companion within computer hosts 24,26, to provide network security without requiring additional hardware. The auditors 20,22 are also hardware SNIUs which are configured to communicate directly with the other SNIUs to log audit events and potentially signal alarms. The above described system 10 enables secured and non-secured users such as a web site 40 to communicate with each other without the danger of compromising security.

During operation, the SNIUs included in the above described system 10 communicate with each other thereby creating a global security perimeter for end-to-end communications and wherein the network may be individually secure or non-secure without compromising security of communications within the global security perimeter.

Security System Policies

The SNIU devices in accordance with the present invention may implement a number of security policies suitable to the circumstances of a given network environment. The major policy areas are: discretionary access control; mandatory access control; object reuse; labeling; identification and authentication; audit; denial of service detection; data type integrity; cascading control; and covert channel use detection.

Discretionary access control is a means of restricting access to objects (data files) based on the identity (and need to know) of the user, process, and/or group to which the user belongs. It may be used to control access to user interface ports based on the identity of the user. For a single-user computer unit, this mechanism may be implemented in the SNIU, whereas for a multi-user host, the DAC control may be implemented at the host machine. Discretionary access control may also be implemented as discretionary dialog addressing, wherein the addressing of all communications originated by a user is defined, and for user discretionary access denial, wherein a user may refuse to accept a communication from another user.

Mandatory access control is a means of restricting access to objects based on the sensitivity (as represented by a classification label) of the information contained in the objects, and the formal authorization (i.e., clearance) of the user to access information of such sensitivity. For example, it may be implemented as dialog lattice-based access control, wherein access requires a correct classification level, integrity level, and compartment authorization, dialog data-type access control, wherein correct data type authorization is required for access, and cascade protection, wherein controls are provided to prevent unauthorized access by cascading user access levels in the network.

Object reuse is the reassignment and reuse of a storage medium (e.g., page frame, disk sector, magnetic tape) that once contained one or more objects to be secured from unauthorized access. To be secured, reused, and assigned to a new subject, storage media must contain no residual data from the object previously contained in the media. Object reuse protection may be implemented by port reuse protection, session reuse protection, dialog reuse protection, and/or association reuse protection.

Labeling requires that each object within the network be labeled as to its current level of operation, classification, or accreditation range. Labeling may be provided in the following ways: user session security labeling, wherein each user session is labeled as to the classification of the information being passed over it; dialog labeling, wherein each dialog is labeled as to the classification and type of the information being passed over it; and host accreditation range, wherein each host with access to the secured network is given an accreditation range, and information passing to or from the host must be labeled within the accreditation range.

Identification is a process that enables recognition of an entity by the system, generally by the use of unique user names. Authentication is a process of verifying the identity of a user, device, or other entity in the network. These processes may be implemented in the following ways: user identification; user authentication; dialog source authentication, wherein the source of all communication paths is authenticated at the receiving SNIU before communication is allowed; SNIU source authentication, wherein the source SNIU is authenticated before data is accepted for delivery; and administrator authentication, wherein an administrator is authenticated before being allowed access to the Security Manager functions.

An audit trail provides a chronological record of system activities that is sufficient to enable the review of an operation, a procedure, or an event. An audit trail may be implemented via a user session audit, a dialog audit, an association audit, an administrator audit, and/or a variance detection, wherein audit trails are analyzed for variance from normal procedures.

Denial of service is defined as any action or series of actions that prevent any part of a system from functioning in accordance with its intended purpose. This includes any action that causes unauthorized destruction, modification, or delay of service. The detection of a denial of service may be implemented for the following condition: user session automatic termination, such as when unauthorized access has been attempted; user machine denial of service detection, such as detection of a lack of activity on a user machine; dialog denial of service detection; association denial of service detection, such as detection of a lack of activity between SNIUs; and/or data corruption detection, such as when an incorrect acceptance level is exceeded, Covert channel use is a communications channel that allows two cooperating processes to transfer information in a manner that violates the system's security policies. Detection of covert channel use may be implemented, for example, by delay of service detection, such as monitoring for unusual delays in message reception, or dialog sequence error detection, such as monitoring for message block sequence errors.

Details Of the Software SNIU

Figure 2:
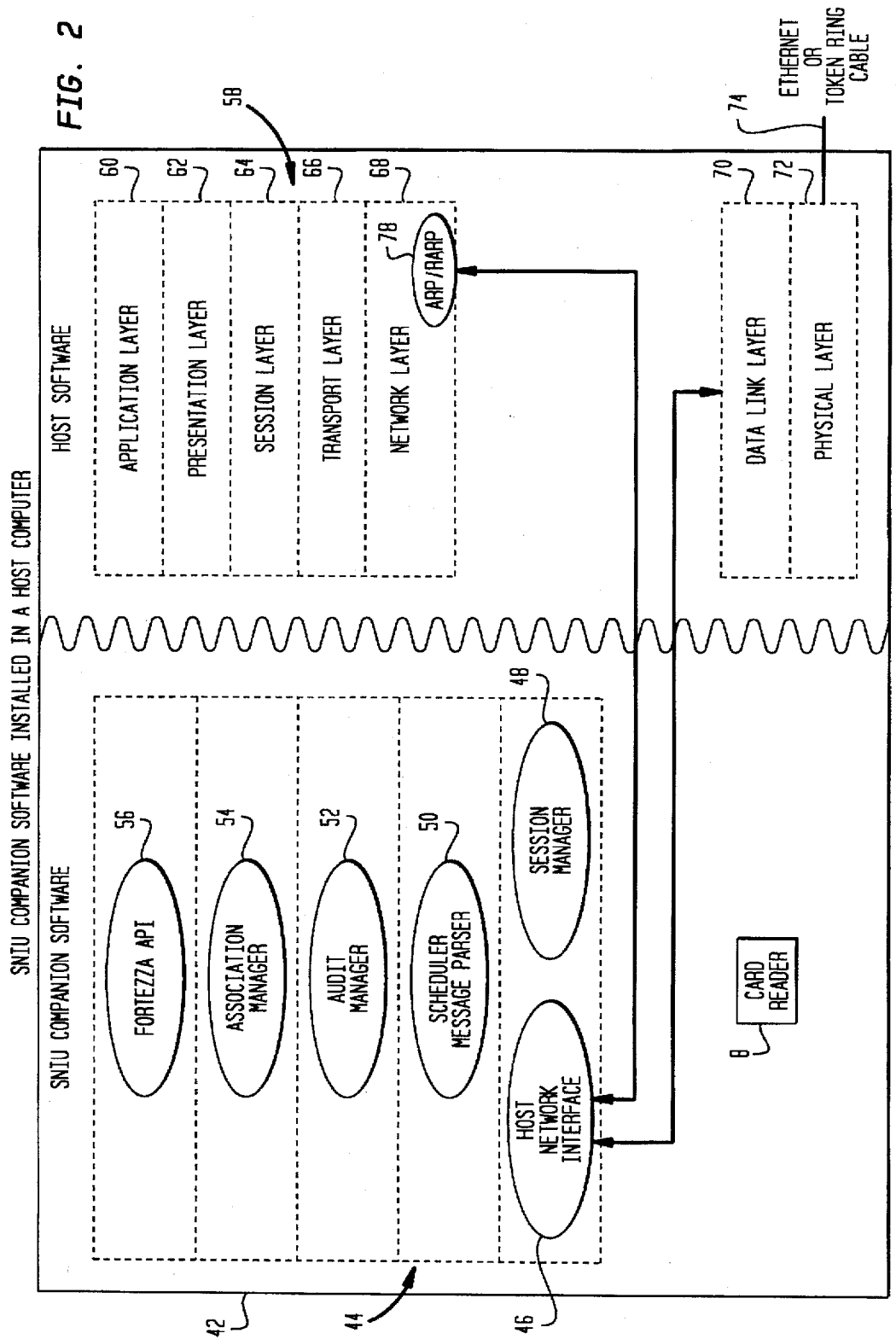
FIG. 2 is a block diagram of the software SNIU installed in a computer host in accordance with the present invention.

Referring to FIG. 2, a block diagram of the software SNIU installed in a computer host is shown. The software SNIU 44 is implemented as a software function within a host computer 42. The SNIU 44 interfaces with the communications stack of the host computer 58 in order to send and receive messages over the Ethernet or token ring cable 74. The communications stack 58 is a typical OSI model including a physical 72, data link layer 70, network layer 68, transport layer 66, session layer 64, presentation layer 62 and application layer 60. The network layer 68 includes an ARP/RARP module which is utilized to process Address Resolution Protocol (ARP) and Reverse Address Resolution Protocol (RARP). As can be seen from FIG. 2, the SNIU 44 is installed between the network and data link layers of the communications stack 68,70, which enables it to be transparent to the other high order software.

The main modules of the SNIU include a Host/Network Interface 46, Session Manager 48, Audit Manager 52, Association Manager 54 and Fortezza API 56. The primary data structures included in the SNIU are the Association Table, Sym_Key Table, Certificate Table, Waiting Queue and Schedule Table. These data structures are described later in the description of the protocol.

The Host/Network Interface 46 provides the interfacing between the SNIU 44 and communications stack 58. The Fortezza API 56 is a driver for the card reader 8 included in the host computer 42. The card reader 8 is adapted to receive a Fortezza card which is a PCMCIA card configured to perform integrity and authenticating functions. The Fortezza card performs the integrity function by encrypting messages leaving the SNIU 44 and decrypting incoming messages. The authentication function is accomplished by the Fortezza card generating and reading digital signatures which are unique to each SNIU. The Fortezza card includes a private key to generate the digital signature and a public key to read the signatures. The other SNIU modules will be described in conjunction with data flow diagram of FIG. 3.

Figure 3:
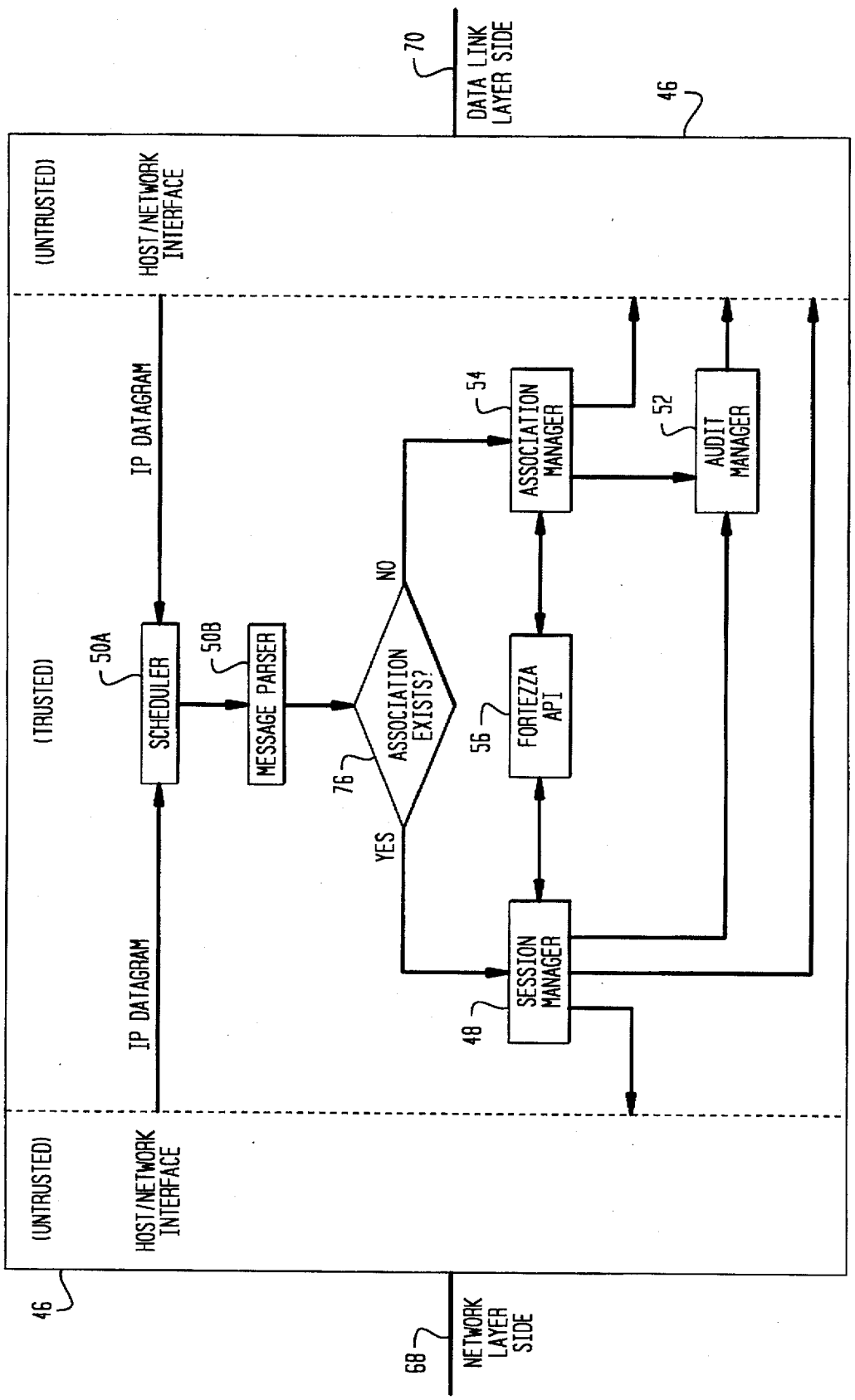
FIG. 3 is a data flow diagram for the software SNIU in accordance with the present invention.

Referring to FIG. 3, there is shown a data flow diagram for the software SNIU. When the host computer communicates with another computer over a network, the communications protocol stack within the computer processes the data to be transmitted. If a user on the computer is transmitting a file to another computer, the user may select the file to send by interacting with application layers software. The display which the user sees is controlled by presentation layer software. Session layer software checks the users permission codes to determine if the user has access to the file. Transport layer software prepares Internet Protocol Datagrams containing blocks of file data and determines that the transmitted file data is properly received and acknowledged or is re-transmitted.

The Host/Network interface 46 is utilized to intercept the data packets transmitted between the network and data link layers 68, 70. The interface 46 is utilized to format the data packets into an appropriate format depending on whether the data packet is incoming or out going. The interface 46 accomplishes this by removing the hardware address header when it receives a data packet and re-applies the same header when the packet is released (even if the underlying IP address header was changed). Since the interface in the software SNIU 46 does not handle ARP and RARP message for the host computer, it can be smaller than the one utilized in the hardware SNIU. As previously described, the ARP/RARP module included in the network layer 68 performs this function.

When the untrusted Host/Network Interface 46 completes re-assembling an IP datagram from a host computer, the datagram is passed to the Trusted Computing Base (TCB) of the SNIU for processing. The TCB is the collection of hardware and software which can be trusted to enforce the security policy. In a SNIU Guard the trusted Scheduler software module controls the hardware which controls access to memory and guarantees that IP datagrams are not passed directly from the host-side Host/Network interface module to the network-side Host/network Interface module or vice versa. Rather, each IP datagram is passed to the SNIU's other trusted software modules (Message Parser, Association Manager, Session manager, etc.) which determine if the IP datagram is allowed to pass through the SNIU and if it is encrypted or decrypted. In a SNIU Companion the hardware is controlled by the host's operating system software and not the SNIU's Scheduler module. Therefore, the SNIU Companion is not as trustworthy as the SNIU Guard, even though most of the software is identical.

The Message Parser 50B is the first module in the TCB which processes an IP datagram received from the host computer. The Message Parser 50B checks the Association Table 76 and determines whether or not an association already exists for sending the datagram to its destination if no association exists, the datagram is stored on the Waiting Queue and the Association Manager 54 is called to establish an association between this SNIU and the SNIU closest to the destination host. If an association does exist, the Session Manager 48 is called to encrypt the datagram, check security rules, and send the encrypted Protected User Datagram (PUD) to the peer SNIU.

When the Association Manager 54 is called, it prepares two messages to initiate the association establishment process. The first message is an Association Request Message which contains the originating host computer level and this SNIU's certificate (containing it's public signature key). This message is passed to the Fortezza API 56 which controls the Fortezza card which signs the message with this SNIU's private signature key. The second message is an ICMP Echo Request message which will be returned to this SNIU if it is received by the destination host. Both messages are passes to the network-side Host/Network Interface Module 46 to be transmitted to the destination host.

If another SNIU exists on the network between the originating SNIU and the destination host, the messages are first processed by the SNIU's receiving port's Host/Network Interface 46 which reassembles the messages and passes them to the trusted software. The Message Parser module 50B passes the Association Request Message to the Association Manager 54 module and deletes the ICMP Echo Request message. The Association Manager 54 passes the message to the Fortezza API 56 which verifies the digital signature. If not valid, the Audit Manager 52 is called to generate an Audit Event Message to log the error. If the signature is OK, the Association Manager 54 saves a copy of the received Association Request Message in the Waiting Queue, adds this SNIU's certificate to the message, calls the Fortezza API 56 to sign the message, generates a new ICMP Echo Request message, and passes both messages to the Host/Network Interface module 46 to transmit the messages to the destination host. If the messages are received by any other SNIU's before reaching the destination host, this process is repeated by each SNIU.

If the destination host computer does not contain the Companion SNIU software, the host's communications protocol stack software automatically converts the ICMP Echo Request message to an ICMP Echo Reply and returns it to the SNIU which sent it. However, the destination host does not contain any software which can process the Association Request Message; so it is ignored (i.e., deleted).

If the destination host computer does contain Companion SNIU software, the host's data link layer software converts the stream of bits from the physical layer into packets which are passed to the Companion's Host/Network Interface module 46. The hardware address headers are stripped off of the packets and saved; and the packets are re-assembled into IP datagrams which are passed to the Message Parser 50B. The ICMP Echo Request message is ignored; and the Association Request Message is passed to the Fortezza API 56 to have the signature verified. If valid, the message is passed to the Association Manager module 54 which saves the originating host and SNIU data and generates an Association Grant Message. This message contains the SNIU's IP address (which is the same as the destination host's), the SNIU's certificate, the host's security level, and sealer keys for the originating SNIU and the previous intermediate SNIU (if there was one). The sealer keys (a.k.a. Message Encryption Keys) are explained elsewhere.

The Fortezza API 56 is then called to sign the message which is passed to the Host/Network Interface module 46. The Association Grant Message is converted from an IP datagram to network packets and passed back to the host's hardware packet drivers (in the data link layer) for transmission back to the originating host.

Any intermediate SNIU's which receive the Association Grant Message process the message up through the communications stack protocol layers to the network layer which calls the Message Parser 50B to process the message. The signature on the message is verified by the Fortezza API 56 and audited via the Audit Manager 52 if not valid. Otherwise, the validated message is processed by the Association Manager 54 module which removes and saves one of the sealer keys (a.k.a. a release key) which will be used by this SNIU and the previous SNIU (which generated the key) to authenticate PUD messages exchanged via this association in the future. The Fortezza API 56 is called to generate and wrap another sealer key to be shared with the next SNIU in the association path. The new key and this SNIU's certificate are appended to the message. The Fortezza API 56 aligns the message. The Host/Network Interface 46 transmits the message on its way back to the originating SNIU.

The originating SNIU re-assembles the Association Grant Message via the physical, data link 70, and network layers 68 as previously described. The signature is validated and audited if necessary. If valid, the Association Manager 56 uses the Fortezza API to unwrap the sealer key(s). If two keys are in the received message, the bottom key is a release key to be shared with the first intermediate SNIU; and the top key is an association key to be shared with the peer SNIU (which granted the association). If there is only one key, it is the association key which is shared with the peer SNIU; and the association path does not contain any intermediate SNIUs. Once the keys are stored and the Association Table 76 is updated, the association is established and the Session Manager 48 is called to transmit the original user datagram which was stored in the waiting Queue prior to issuing the Association Request Message.

The Session Manager 48 enforces the security policy, determines whether IP datagrams received from host computers can be transmitted via the network to their destination host, encapsulated these user datagrams in PUDs using the sealer keys for the appropriate association. The security policy is enforced by comparing the security levels of the host and destination. If the security levels are the same, the Session Manager checks the Association Table and identified the appropriate peer SNIU and sealer key(s). The user datagram is encrypted by the Fortezza API 56 using the association key. If the association contains any intermediate SNIUs, the Fortezza API 56 calculates a message authorization code using the release key. The Session Manager 48 creates a PUD addressed from this SNIU to the peer SNIU, encloses the encrypted user datagram, appends the message authorization code (if any), and passes the new datagram to the Host/Network Interface module 46 on the network-side of the SNIU. The datagram is broken into packets and transmitted as previously described.

If an intermediate SNIU receivers the PUD, the data is passed through the data link layer software 70 to the network layer where the re-assembled datagram is passed to the Session Manager 48. The source IP address is to identify the release key which is shared with the previous SNIU. The Fortezza API 56 uses the release key to verify the message authorization code. If not valid, the Session Manager 48 deletes the datagram and calls the Audit Manager 52 to generate an Audit Event Message. If the code is valid, it removes the code from the datagram, and uses the destination IP address to identify the release key shared with the next SNIU. The Fortezza API 56 generates a new message authorization code. The Session Manager 48 appends the new code and passes the datagram to the opposite port's Host Network Interface module.

When the peer SNIU (i.e., the destination IP address) received the PUD and it has been reassembled into a datagram, the Message Parser 50B passes the datagram to the Session Manager 48. The source IP address is used to identify the corresponding association key. The Fortezza API 56 decrypts the original user datagram. The Session Manager checks the message authorization code and the security levels of the source and destination hosts. If the code is valid (i.e., the message was not modified during transmission over the network) and the security levels match, the decrypted datagram is passed to the Host/Network Interface 46 to be released to the destination host. If either is not correct, the Audit Manager 52 is called.

Limited Write Downs to Lower Security Classification Levels

Figure 7:
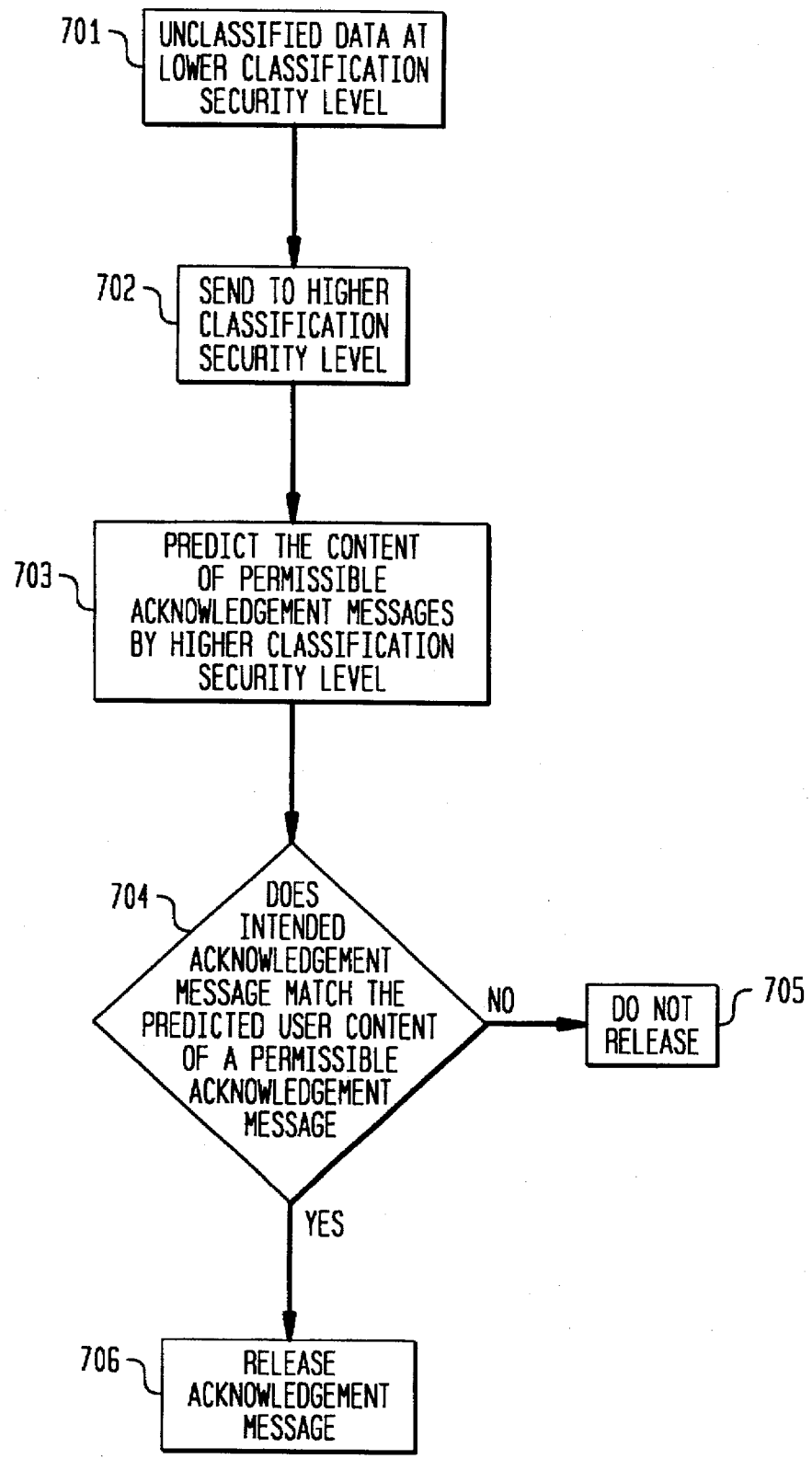
FIG. 7 is a flow chart of the steps for limited write downs of data from higher security classification levels to lower security classification levels.

Referring now to FIG. 7, there is shown a flow chart of the process for limited write downs from higher security classification levels to lower security classification levels. Generally, security policies for computer network communications do not restrict the movement of lower unclassified data 701 from sources operating at lower security classification levels to sources operating at higher classification levels 702. The data is just upgraded to the classification of the higher level. However, most IP (Internet Protocol) based data transfer protocols require acknowledge or feedback messages to confirm the transfers. These feedback messages could be used to covertly send information from the higher to the lower classified network. The present SNIU prevents the potential of transferring covert information in the IP data transfer protocol feedback messages by closing this channel (feedback message transmission) by predicting the user content of permissible feedback messages 703 that would constitute a legitimate write down, i.e., transfer of data from the high side to the low side. This prediction process is deterministic and a function only of information present on the low security level (low side). As a result the predicted user content is releasable 706 to the low side only if it matches the predicted information 704, otherwise, it is not releasable 705.

As an example of the deterministic prediction process, the TFTP (trivial file transfer protocol), requires an acknowledgment for each 512 kbyte block of data transferred. The sequence and exact content of each acknowledgment can be determined based on the TFTP data packets originating on the low side. Therefore, by using the prediction method, the acknowledgment messages generated on the high side are only used to determine when a predicted message is released to the low side. The content of the message is unaffected.

This same prediction approach can also be used to allow IP datagrams (unit packets of information and associated delivery information) that contain nondeterministic data such as IP addresses to be released from high to low level classification networks if band limited covert channels can be tolerated. The deterministic portions of a message are predicted and the non-deterministic portions identified. When the predicted message is received, the non-deterministic portion is checked for proper format and inserted into the predicted message. By monitoring the number of non-deterministic bits in each such message, messages can be discarded if rate of non-deterministic bit release exceeds a predetermined rate. Thus, the bandwidth of the covert channel can be limited to whatever rate is deemed acceptable. When the non-deterministic portion of the messages is an IP address, the SNIU builds trust in the addresses through a chain of predicting and then verifying addresses and monitoring their use and change. That is, source and destination address pairs that go from the lower side to the higher side are saved and used to predict destination and source addresses that would be a part of predicted messages. Additionally, putative addresses are checked to assure that they are in fact IP addresses and any changes in such addresses are monitored and audited to assure that no exploitable channel remains that uses those addresses.

The SNIU unit maintains a table of information corresponding to each Host pair for which it supports an association. That table includes a predicted message that is an IP datagram whose IP addresses have already been confirmed as being legitimate IP addresses and user data based upon flow from the low to high side. Typically, the predicted message is a flow control or acknowledgment message and its syntax is based upon the protocol identified in the legitimated low side to high side communications path. Upon receipt of a putative feedback message, its contents are compared by trusted software with that of the predicted message. If they agree, the predicted message is released to the low side.

Address Resolution Messages

The following is a discussion of the protocols and address messaging applicable to both the hardware and software embodiments of the SNIU:

Address Resolution Protocol (ARP) allows a SNIU to find the hardware address of another SNIU or host on the same network, given its IP address. The SNIU broadcasts an ARP Request message which contains its hardware and IP addresses and the IP address of the target host. The target host (or other SNIU) returns to the requesting host an ARP Response message which contains the hardware address of the target host (or other SNIU).

Reverse Address Resolution Protocol (RARP) allows a SNIU which only knows its hardware address to obtain an IP address from the network. The host broadcasts a RARP Response which contains its hardware address, and a server on the network returns a RARP Response containing an IP address assigned to the requester's hardware address. All ARP and RARP messages have the same format and are contained within the frame data area of a single Ethernet frame (they are not IP datagrams). The format of the ARP and RARP messages is shown in the Table of FIG. 3.

Referring to FIG. 3, the HARDWARE TYPE is set to 0001 hex to indicate Ethernet. The PROTOCOL TYPE is set to 0800 hex to indicate IP addresses. The HLEN (hardware address length) is set to 06 hex bytes, while the PLEN (protocol address length) is set to 04 hex bytes. The OPERATION is set 0001 hex for an ARP request message, 0002 hex for ARP response message, 0003 hex for an RARP request message or 0004 hex for RARP response message. The SENDER'S HA contains the sender's 48 bit Ethernet hardware address, while the SENDER'S IP contains the sender's 32 bit IP address. The TARGET'S HA contains the target's 48 bit Ethernet hardware address, while the TARGET's IP contains the sender's 32 bit IP address.

When a SNIU broadcasts a request message, it fills in all of the data and the target's hardware address field is set to 000000 hex for an ARP message. If the message is a RARP, then the sender's and target's IP address fields are set to 0000 hex. When the target machine responds, it fills in the missing address and changes the operation field to indicate a response message. During an ARP, the target machine swaps the sender's and target's addresses so that the sender's address fields contains its addresses and the target's address fields contains the original requesting host's addresses. During a RARP, the server stores its addresses in the sender's address fields and returns the response to the original sender's hardware address.

When a SNIU receives a message, it performs the following processes:

ARP Request—If an ARP Request message is received on a SNIU's port A, the untrusted software in port A's memory segment determines if the sender's IP address is in port A's ARP cache. If not, it creates a new entry in the ARP cache and inserts the sender's hardware and IP addresses. Otherwise, the sender's hardware address is copied into the entry (overwriting any previous address) and packets (if any) waiting to be sent to the sender's IP address are transmitted. If the target's IP address is in port A's address list (i.e., a List of IP addresses which are accessed from port B), the untrusted software returns an ARP Response message swapping the SENDER'S and TARGET'S addresses and inserting port A's Ethernet hardware address into the SENDER's HA field. In either case, the untrusted software passes the ARP Request Trusted Computing Base (TCB).

The TCB checks port B's address list for the SENDER'S IP. If the SENDER'S IP is not in port B's address list, the TCB determines whether the SENDER'S IP is releasable to port B. If releasable, the TCB inserts SENDER'S IP into port B's address list. Secondly, the TCB determines whether a proxy ARP Request should be broadcast from port B. If an ARP Response message was not returned by port A and the target's IP address is not in port A's ARP cache, then the sender's IP is releasable to port B. Thus, causing the TCB to create a proxy ARP Request message. The TCB inserts port B's hardware and IP addresses in the SENDER'S address fields, copies the target's IP address from the original ARP Request into the TARGET'S IP field and then signals port B's untrusted software to broadcast the message.

Each time the TCB releases a proxy ARP Request, it creates an Anticipated Message in the form of a proxy ARP Response message. This proxy ARP Response message contains the original sender's addresses in the TARGETS fields, the target's IP address in the SENDER'S IP field and port A's hardware address is the SENDER'S HA field. This message is saved in the Anticipated Message list for port A and will be released to port A's untrusted software for transmission, if the anticipated ARP Response message is received on port B. Note that whether this message is released may involve the TCB modulating ARP Requests from a high network to a low network in order not to exceed the 100 bits per second covert channel bandwidth requirement.

ARP Response—If an ARP Response message is received on a SNIU's port A, the untrusted software in port A's memory segment determines if the sender's IP address is in port A's ARP cache. If not, it creates a new entry in the ARP cache and inserts the sender's hardware and IP addresses. Otherwise, the sender's hardware address is copied into the entry (overwriting any previous address) and packets (if any) waiting to be sent to the sender's IP address are transmitted. Finally, the untrusted software passes the ARP Response to the TCB.

The TCB checks port B's address list for the SENDER'S IP. If the SENDER'S IP is not in port B's address list, the TCB determines whether the SENDER'S IP is releasable to port B. If releasable, the TCB inserts it into port B's address list. Secondly, the TCB checks the Anticipated Message list for port B and determines whether the ARP Response was due to a proxy ARP Request made for a request originally received on port B. If the SENDER'S IP matches an entry in the Anticipated Message List and the message is releasable to port B, the TCB signals port B's untrusted software to create a proxy ARP Response message identical to the Anticipated Message and then removes the message from the Anticipated Message list for port B.

RARP Request—If a RARP Request message is received on a SNIU's port A, the untrusted software in port A's memory segment checks a flag to determine if the SNIU was initialized to act as a RARP server for the network attached to port A. If not, the received message is ignored. Otherwise, the untrusted software passes the RARP Request to the TCB.

The TCB determines whether the RARP Request can be released to port B. If releasable, it creates a proxy RARP Request message copying the TARGET'S HA from the received message and inserting port B's addresses in the SENDER'S HA and IP fields. Then the TCB passe the proxy RARP Request message to port B's untrusted software for broadcast and creates an Anticipated message in the form of a proxy RARP Response message. The TCB copies the original TARGETS HA, inserts port A's hardware address in the SENDER'S HA and saves it in the Anticipated Message list for port A.

RARP Response—If a RARP Response message is received on a SNIU's port A, the untrusted software in port A's memory segment determines if the sender's IP address is in port A's ARP cache. If not, it creates a new entry in the ARP cache and inserts the sender's hardware and IP addresses. Otherwise, the sender's hardware address is copied into the entry (overwriting any previous address) and packets (if any) waiting to be sent to the sender's IP address are transmitted. Finally, the untrusted software inserts the TARGET'S IP into port A's address list and passes the RARP Response to the TCB.

The TCB checks port B's address List for the SENDER'S IP. If the SENDER'S IP is not in port B's address list, the TCB determines whether the SENDER'S IP is releasable to port B. If releasable, the TCB inserts it into port B's address list. Secondly, the TCB determines whether the TARGETS IP is releasable to port B. If releasable, the TCB creates a new entry in port B's ARP cache and inserts the TARGETS HA and IP. The TCB uses the TARGETS HA to find the appropriate proxy RARP Response message in port B's Anticipated Message List and copies the TARGETS IP and SENDER'S IP into the Anticipated message. Then the TCB signals port B's untrusted software to create a proxy RARP Response message identical to the Anticipated Message, and removes the message from the Anticipated Message list for port B.

Association Establishment Messages

SNIUs establish associations in order to authenticate each other, exchange security parameters, and establish trusted sessions for communication. The SNIUs utilize a standard ICMP Echo Request message to request an association and an ICMP Echo Reply message to grant an association.

When a host behind a SNIU attempts to communicate with someone else over the network, the SNIU stores the datagram from the host in a waiting queue and transmits an ICMP Echo Request to the intended destination. This message is used to identify other SNIU units in the communications path and to carry the originating SNIU's security parameters. The SNIU inserts the originating host's security level, appends its certificate and then signs the message. Each SNIU unit which receives this message authenticates the message, saves a copy of the previous SNIU's certificate, appends its certificate, and signs the message before sending it to the destination.

The destination host returns an ICMP Echo Reply to the originating SNIU. The first SNIU to receive this message is the terminating SNIU (i.e., closest to the destination) in the potential association's communications path. This SNIU determines if the association should be permitted (i.e., would not violate the security policy). If permitted, the SNIU grants the association, generates an encryption key for the association, and encrypts the key using the originating SNIU's public key (from its certificate). If the Echo Request message contained an intermediate SNIU's certificate, the SNIU also generates a release key and encrypts it using the intermediate SNIU's public key. In either case, the SNIU removes its and the originating SNIU's security parameters and signatures from the ICMP Echo Reply, stores the encrypted key(s), inserts the destination host's security level, appends its certificate, signs the message and sends it onto the originating SNIU.

Each intermediate SNIU (if any exist) which receives the Echo Reply message authenticates the previous SNIU's signature, extracts the release key, generates a new release key for the next SNIU, encrypts the key using the public key (from the certificate saved from the Echo Request message) of the next SNIU, removes the previous intermediate SNIU's certificate and signature, appends its own certificate and signature, and sends the message on the return path. When the originating SNIU receives the ICMP Echo Reply, it authenticates the message and extracts the key(s).

Once the association is granted, the originating SNIU fetches the originating host's datagram from the waiting queue and prepares to send it to the terminating SNIU in the newly established association. The SNIU uses the association key to encrypt the datagram for privacy. The SNIU further stores the encrypted datagram and the encryption residue into a new datagram from the originating SNIU to the terminating SNIU. If the association contains intermediate SNIUs, the originating SNIU uses the release key to calculate a second encryption residue and appends it to the datagram. Finally, the SNIU transmits the protected user datagram to the peer SNIU in the association.

When the protected user datagram is received by an intermediate SNIU (if any in the path), the intermediate SNIU fetches the release key corresponding to the previous SNIU and uses the release key to validate the datagram. If valid, the SNIU removes the release key residue from the datagram and checks to determine whether there are more intermediate SNIUs in the path before reaching the terminating SNIU. If another intermediate SNIU exists, the release key corresponding to the next intermediate SNIU is used to calculate a new release residue which is appended to the datagram. In either case, the datagram is sent on its way out the opposite port from which it was received.

When the terminating SNIU receives the protected user datagram, it uses the association key corresponding to the originating SNIU to decrypt and validate the datagram. If the source and destination hosts are at the same security level (i.e., a write-equal situation), the decrypted datagram is sent out the opposite port to the destination host. If the source host has a lower security level than the destination (i.e., a write-up situation), the SNIU predicts the response from the destination and saves it before sending the decrypted datagram to the destination host.

If the source host has a higher security level than the destination (i.e., a write-down situation), the received datagram (i.e., a response to a previous datagram from the lower level host) was predicted by the SNIU which sent the protected datagram. Therefore, this SNIU is assured that the classification of the received datagram is dominated by the lower Level destination host, so that the datagram is released to the destination. If a SNIU receives a user datagram from a native host which would be a write-down to the destination host and no predicted datagram is found, the received datagram is erased and the attempted write-down is audited.

Message Processing Tables

There are three tables which are used to process in-coming and out-going messages including the Association Table, the Symmetric Key Table(Sym_Key) and the Certificate Table. Each SNIU has to Association Tables, one for each port. Each entry contains data corresponding to a particular source or destination IP address. The Sym_Key table contains data corresponding to a particular message encryption key (MEK) which could be used as a release key or an association key. The Certificate table contains recently received certificates from other SNIU's.

Each table consists of a linked list of tokens in which the data for an entry in the table is stored in a token. The tokens for each table have a unique data structure and are linked together in 'free' lists during initialization. When a new entry is made in one of the tables, a token is removed from the free list for that table's tokens, the data for the new entry is inserted in the appropriate fields of the token and the to the token and the token is linked at the top of the table removed from a table, the 'previous' and 'next' tokens are linked, the data fields in the token are cleared and the token is linked at the bottom of the appropriate free list. Whenever the data in an entry is used, the token is removed from the table and relinked at the top of the table. In this way the oldest (i.e., least used) entry is at the bottom of the table.

If a new entry is needed and the free list is empty, the bottom token is removed from the table, the data fields are cleared, the new entry's data is inserted and the token is linked at the top of the table. In addition, when a SNIU removes the bottom (oldest unused) token in the Sym_Key Table, it also removes every token in the Association Table which pointed to the removed key. A SNIU does not send a Close Association Message when a certificate, key or Association Table entry is removed because many valid entries using the same association may still exist. The data structure for a token of the Association Table is shown in the Table of FIG. 5.

Referring to FIG. 5, NEXT is a pointer to the next token in the table or list. PREVIOUS is a pointer to the previous token in the table or list. IP ADDRESS is the IP address of the source/destination, while PEER SNIU IP ADDRESS is the address of the other terminating SNIU for the association. ASSOCIATION KEY POINTER points to the association MEK in the Sym_Key table. RELEASE KEY POINTER points to the release MEK in the Sym_Key table. The ASSOC-TYPE is set to 0001 hex for 'pending', 0002 hex for 'host' (i.e., the entry is for a host destination), 0003 hex for 'sniu' (i.e., the entry is for a SNIU destination), 0004 hex for 'native host' (i.e., no peer SNIU) or 0005 hex for 'audit catcher'. The RELKEY-TYPE is set to 0001 hex for 'in' (i.e., use to validate release key residue), 0002 hex for 'out' (i.e., use to add release key residue) or 0003 hex for 'both'. SECURITY-LEVEL indicates the security level of the source/destination, while SPARE is an unused byte to keep addressing on a 32-bit boundary.

Referring to FIG. 6, there is shown the data structure of a token for the Sym_Key Table according to the present invention. NEXT is a pointer to the next token in the table or list, while PREVIOUS is a pointer to the previous token in the table or list. DISTINGUISHED NAME is the 128 byte name in certificate from the other SNIU using this key. MEK is the 12 byte wrapped key (association or release) shared with the another SNIU. IV is the 24 byte initialization vector associated with the MEK. CERTIFICATE POINTER points to the other SNIU's certificate in the Certificate table. INDEX is a Fortezza card key register index which indicates if and where the key is loaded (1–9 are valid key register indexes, while 0 indicate that the key is not loaded on the Fortezza). SPARE is an unused byte to keep addressing on a 32-bit boundary.

Message Flag

Any message (IP datagram) which is generated or modified by a SNIU unit contains a Message Flag in the last four bytes of the datagram. The first byte is the message type field, the second byte is the message format field and the third and fourth bytes are the Flag. Note that all SNIU message types are signed except for a Protected User Datagram (PUD) which uses message encryption key (MEK) residues for integrity and authentication. The following is a list of message types: Audit Event, Audit Catcher List, Audit Mask, Association Close, Association Request, Association Grant, Association Unknown, Protected User Datagram, Receipt, and Certificate Revocation List. The following are message formats: Signed Type 1 (source SNIU's certificate and signature), Signed Type 2 (source and intermediate SNIU's certificates and signature), PUD Type 1 (Association MEK residue), and PUD Type 2 (Association MEK and Release MEK residues).

Waiting Que and Schedule Table

The Waiting Que is used to store IP datagrams for potential future processing based on an anticipated event. For every entry made in the Waiting Que, a corresponding entry is made in the Schedule Table. The Schedule Table is used to automatically process entries in the Waiting Queue if they have not been processed within some predetermined amount of time (i.e., the anticipated event does not occur). The Schedule Table entry contains a time-out field (which is set to the current time plus some reasonable delta representing the maximum waiting period) and a function pointer (which indicates which subroutine should be called if time expires before the Waiting Queue entry is processed). The Schedule Table is checked in the main executive loop of the TCB, expired entries are removed and the corresponding datagrams in the Waiting Queue are processed by the designated subroutine.

For example, when a SNIU receives a user datagram from a native host which is destined for another host for which there is no existing association, the SNIU stores the user datagram in the Waiting Queue and transmits an Association Request message. When the Association Grant message is received, the user datagram is removed from the Waiting Queue, the corresponding Schedule Table entry is deleted, the user datagram is encrypted and sent to the peer SNIU of the association. If an Association Grant message is never received, the Schedule Table entry expires which calls a subroutine to delete the user datagram from the Waiting Queue.

Another example is when the SNIU sends an Audit Event message to an Audit Catcher. The transmitted datagram is stored in the Waiting Queue. When the Receipt message is received from the Audit Catcher, the original Audit Event datagram is removed from the Waiting Queue and the corresponding Schedule Table entry is deleted. If the Schedule Table entry expires, the designated subroutine is called which re-transmits the Audit Event message stored in the Waiting Queue and a new entry is made in the Schedule Table.

Generating and Exchanging MEKs

Message Encryption Keys (MEKs) are generated during the association establishment process (previously described) and are exchanged via the Association Grant Message. When a SNIU generates an MEK, it simultaneously generates an initialization vector (IV).

When a SNIU exchanges an MEK with another SNIU, it generates a random number, RA, which is required to encrypt (i.e., wrap) the MEK. The key exchange algorithm is designed so that only the sending and receiving SNIUs can decrypt the MEK and use it. The sender wraps the MEK for transmission using the destination's public Key RA, RB (which is always set=1) and the sender's private key. IVS which were generated with release keys are transmitted in the clear with the wrapped MEK in the Association Grant Message, while IVS which were generated with association keys are ignored. The recipient unwraps the key using its private key RA, RB, and the sending SNIU's public key. Once unwrapped, the safe exchange is complete.

Each SNIU re-wraps the MEK using its storage key (Ks), stores the MEK and the IV (if the MEK is a release key) in the Sym_Key Table, stores the pointer to the MEK in the Association Table and stores the DN (of the other SNIU sharing this MEK) in the Sym_Key Table entry.

Using MEKs and IVS

Message Encryption Keys (MEKs) are used as association and release keys to provide confidentiality, integrity and authentication of user datagrams during an association between two SNIUs. IVS are used to initialize the feedback loop in the Skipjack encryption algorithm for most modes of operation. Encrypting identical data using the same MEK, but different IVS, will produce different cipher text. In fact, the Fortezza card utilized requires the user to generate a new IV for each encryption event in order to assure that each message looks different when encrypted.

When a SNIU encrypts a user datagram it first generates a new IV for the association key, encrypts the datagram, appends the encryption residue for integrity and authentication purposes, and appends the new IV. If the association involves intermediate SNIUs, the SNIU performs a decrypt operation on the newly encrypted datagram, residue and IV. The decrypt operation uses the release key and release Key IV. The release key IV is never changed since the encrypted data is always guaranteed to be unique even if the original datagram is not. The release key residue is appended to the protected user datagram. The completed protected user datagram is then transmitted.

Received Message Processing

When a SNIU receives an IP datagram, it checks the destination address in the header and determines if it is the intended recipient. Then, the SNIU checks the last four bytes of the IP datagram for the Message flag and determines the type and format of the received message.

Destination SNIU Message Processing

When a SNIU receives an IP datagram which is addressed to it, the message should be one of the following messages: an Audit Event, Audit Catcher list, Audit Mask, Association Close, Association Request, Association Grant, Association Denial, Association Unknown, Protected User Datagram, Receipt and Certificate Revocation List. If it is not, the SNIU audits the event. The only exceptions are ICMP datagrams which are processed by the receiving port's untrusted software and not passed to the trusted computing base.

Audit Event—If the SNIU is not configured to be an Audit Catcher, it will audit the event sending the source IP address of the received message to its primary Audit catcher.

If the SNIU is configured to be an Audit Catcher, it verifies the signature on the message, increments its received audit event sequence number, generates a time stamp, and prints the sequence number, time stamp, source IP address, and ASCII character string from the message. Once the event has been recorded, the Audit catcher SNIU generates a Receipt Message (copies the audit event counter from the received message and inserts it in the message number field), sends it, and checks the receiving port's Association Table for an entry for the source of the received message. If an entry does not exist (i.e., this was the first communication from the source SNIU), the Audit Catcher makes an entry, marks the association type as 'sniu', and sends the SNIU the current audit mask.

Audit Catcher List—The SNIU verifies the signature on the message, stores the new list of Audit catchers in the Configuration table, generates a receipt message, and audits the event.

Audit Mask—the SNIU verifies the signature on the message, stores the new audit mask in the Configuration Table, generates a Receipt Message, and audits the event (in case someone else other than the Audit Catcher is distributing new audit masks). In addition, if the receiving SNIU is an Audit Catcher, it distributes the new audit mask to every destination in the Association Table with an association type of 'sniu'.

Association Close—When a SNIU receives a valid protected User Datagram, but cannot find the destination's Association Table entry, it sends an Association close message back to the originating SNIU and audits the event. The originating SNIU verifies the signature on the received Association Close Message, extracts the original destination host's IP, removes the host's entry from its Association Table and audits the event. It does not remove the peer SNIU's entry nor entries from the Sym_Key table as they might be supporting other associations.

Association Request—This message can only be received by a SNIU which originally transmitted it as an ICMP echo request to some unknown destination which converted it to an Echo reply and returned it to the originator without encountering another SNIU. Therefore, the SNIU uses the source IP address to find the destination's entry in the Association Table, changes the association type from 'pending' to 'native host', sets the security level to that port's security level, finds the original host's user datagram in the Waiting Queue, removes the corresponding entry from the Schedule table, and compares the source and destination security levels to determine if the user program can be sent to the destination. If the comparison indicates a write-up situation, the SNIU generates and saves an anticipated message and releases the original datagram to the destination port. If a write down situation, the SNIU determines if the data gram was predicted and sends the anticipated message or audits as previously described. If a write equal, the datagram is released to the destination port. This procedure is repeated for each entry in the Waiting Queue which is intended for the same destination.

Association Grant—The SNIU verifies the signature in the datagram and updates the receiving port's Association Table entries for the host destination and peer SNIU. The SNIU finds the entry for the destination host, changes the association type from 'pending' to 'host', copies the peer SNIU's IP, extracts and unwraps the association MEK (and release MEK if needed), stores the re-wrapped key(s) in the Sym_Key table, marks the release key type as 'out' (if a release key exists), copies the destination host's security level, and determines if an entry exists for the peer SNIU. If not, the SNIU creates a new entry for the peer SNIU, copies the association and release key pointers and release key type from the destination host's entry, and marks the association type as 'sniu'.

Once receiving the port's Association Table has been updated, the SNIU finds the original hosts user datagram in the waiting Queue, removes the corresponding entry from the Schedule table, and compares the source and destination security levels to determine if the user datagram can be sent to the destination. If the source's security level is dominated by (i.e., less than or equal to) the destination's security level, the SNIU creates a Protected user Datagram (PUD). The SNIU sets the destination to the peer SNIU's IP, sets the protocol type to indicate a SNIU Message, uses the association key to encrypt the entire received datagram, inserts the ciphertext and IV, appends the association residue, generates and inserts a release residue (if the destination host's Association Table entry contains a pointer to a release key), appends the appropriate SNIU Message Flag, and sends the datagram. If the source host is not dominated by the destination (i.e., potential write down, the attempted write down is audited. This procedure is repeated for each entry in the Waiting Queue which is intended for the same destination.

Association Unknown—A SNIU sends an Association Unknown message (and generates audit notices) when a protected user datagram is received and a corresponding Association Table entry does not exist. The message is sent back to the source SNIU and contains the destination SNIU's IP address. When a SNIU receives an Association Unknown Message, it deletes every entry in the Association Table in which the peer SNIU address matches the returned destination SNIU IP. Subsequent user datagrams from the same host sent to the same destination will initiate an Association Request to re-establish the association. Any SNIU involved in establishing an association for which it already has keys (association and/or release keys) will suggest the same key as originally used.

Protected User Datagram—the SNIU uses the source IP to find the appropriate entry in the receiving port's Association Table and retrieve the association key to decrypt and validate the received datagram. If the decryption residue does not match, the even is audited. otherwise, the SNIU uses the destination host's IP to find the appropriate entry in the opposite port's Association Table, retrieves the destination host's security level, and compares it to the security level in the received datagram. If a write-up situation, the SNIU generates an anticipated message. However, regardless of the relative security levels, the decrypted and validated user datagram is sent to the destination host.

If a terminating SNIU receives a PUD and validates the residue but cannot deliver the user datagram because it cannot find the destination host in the Association Table, then the SNIU returns an Association close message to the originating SNIU (containing the destination host's IP) and audits the event.

Receipt—A Receipt message is sent by an Audit catcher to a SNIU for Audit Catcher Request and Audit Event messages. The SNIU uses the message number in the received datagram to locate the saved copy of the original message in the Waiting Queue and remove it and the corresponding Schedule Table entry. If the original message was an Audit Catcher Request Message, the SNIU locates the Association Table entry for the Audit catcher and changes the association type from 'pending' to 'audit catcher'. If time expires in the Schedule Table entry before the Receipt Message is received, the SNIU will retransmit the original message. If no receipt is received after TBD attempts, the SNIU will switch to the next Audit Catcher in the list. If all Audit Catchers are attempted without success, the SNIU will check a configuration parameter to determine whether to continue without audit or halt.

SNIUs issue Receipt messages to Audit catchers for Audit Catcher List, Audit Mask, and Certificate Revocation List messages. When an Audit Catcher receives a receipt, it uses the returned message number to remove the copy of the message from the Waiting Queue and the corresponding Schedule table entry.

Certificate Revocation List—if a Certificate revocation List (CRL) is received, the SNIU returns a receipt to the source and checks the Sym_Key Table for any keys which were received from (or sent to) another SNIU with a revoked certificate, the SNIU deletes the certificate from the Certificate Table (if it is still there), deletes the Sym_Key Table entry, and deletes every entry in the Association Table which pointed to the key. Note that deleting a table entry means to unlink the token from the table, clear the token's memory, and re-link the token in the token's free list.

Non-Destination SNIU Message Processing

When a SNIU receives an IP datagram which is not addressed to it, the message should be one of the following types of Dragonfly formatted messages. If it is not, the SNIU will assume the IP datagram is from a native host.

Audit Event—The SNIU verifies the signature on the message and releases the message out the opposite pen Audit Catcher List—The SNIU verifies the signature on the message and releases the message out the opposite port.

Audit Mask—The SNIU verifies the signature on the message and releases the message out the opposite port.

Association Close—The SNIU verifies the signature on the message and releases the message out the opposite port.

Association Request—When a SNIU receives an Association Request it first checks the IP header to determine if the datagram is an ICMP Echo Request or an ICMP Echo Reply.

If it is an ICMP Echo Request, the SNIU validates the signature at the bottom of the message and checks the receiving port's Association Table for an entry with the originating SNIU's IP address. If the receiving SNIU cannot find an entry, it creates one, marks the association type as 'pending', stores the previous SNIU's certificate in the Certificate Table (if it wasn't already there), updates the Sym_Key Table entry for the Distinguished Name (DN), and stores the pointer to the Sym_Key Table entry in the release key pointer field in the Association Table entry. If the previous SNIU was an intermediate SNIU (i.e., the Message Format field of the SNIU Message Flag is 'Signed Type 2'), this SNIU marks the release key type field as 'out' and removes the previous SNIU's certificate and signature. In either case, this SNIU appends its certificate and signature and sends the message out the other port. It does not make any entry in the out-going port's Association Table.

If it is an ICMP Echo Reply, this SNIU is the terminating SNIU which must generate the Association Grant Message. Before the SNIU can validate the received message, it must reconstruct the message to match the form it was in when the SNIU signed it before the destination host converted the ICMP Echo Request into an ICMP Echo Reply. Therefore, the SNIU exchanges the source and destination IP addresses in the datagram header and changes the type field in the ICMP header from a request (8) to a reply (0). Then the SNIU validates the signature at the bottom of the newly reconstructed message using its own public key. If the signature cannot be validated, the event is audited.

If the ICMP Echo Reply is valid, the SNIU creates or updates three Association Table entries. First, it creates an entry (if it doesn't already exist) in the receiving port's Association Table for the original destination host (using the destination IP from the modified datagram header), marks the association type as 'native host' and stores the receiving port's security level in the security level field. Second, it updates the entry in the opposite port's Association Table for the peer SNIU (using the source IP from the modified datagram header). If the release key type is marked 'out' or 'both', then the association path contains at least one intermediate SNIU; therefore, the SNIU extracts the peer SNIU's certificate from the datagram, stores it in the Certificate Table, stores the pointer to the certificate and the DN in a Sym_Key Table entry, and stores the pointer to the Sym_Key Table entry in the association key pointer field of the Association Table entry. If there aren't any intermediate SNIUs, the pointer in the release key pointer field is copied to the association key pointer field; and the release key pointer field is cleared. In either case the association type is marked as 'sniu'. The third Association Table entry is for the originating host. It's IP and security level are in the data portion of the received datagram. The security level is copied into the entry, the association type is marked as 'host', and the rest of the data is copied from the peer SNIU entry. Finally, the SNIU generates the association key (and if necessary, the release key) and stores the key(s) in the Sym_Key Table entry(s).

Once the Association Table entries are updated, an Association Grant Message is generated. The SNIU uses the peer (i.e., originating) SNIU's IP for the destination, uses the original destination host's IP for the source, and marks the protocol and type fields to indicate an ICMP Echo Reply. The SNIU inserts its IP address, its certificate, its host's security level, the association key data (wrapped key and RA), and if necessary, the release key data (the wrapped key, RA and IV). The SNIU Message Flag is inserted at the bottom marking the type as Association Grant and the format as Signed Type 1 to indicate only one certificate. The message is signed and sent.

Association Grant—The SNIU validates the signature at the bottom of the received datagram and, if not correct, audits the event. Otherwise, since it is not the destination, the SNIU is an intermediate SNIU somewhere in the path between the two peer SNIUs. The SNIU creates an entry (if one doesn't already exist) in the receiving port's Association Table for the IP of the terminating SNIU which granted the association (note that the terminating SNIU's IP is not in the header of the received datagram, rather it is in the data area), marks the association type as 'sniu', marks the release key type as 'in' (if the format is 'Signed Type 1') or 'both' (if the format is 'Signed Type 2'), extracts the release key data (i.e., the wrapped MEK, RA and IV), unwraps and stores the release key in the Sym_Key Table, stores the release key IV in the same Sym_Key Table entry, stores the pointer to the release key in the Association Table, stores the certificate in the Certificate Table, and stores the pointer to the certificate and the DN in the Sym_Key Table entry.

Next, the SNIU uses the destination IP address in the header of the received Association Grant Message to find the destination's entry in the opposite port's Association Table. If the association type is 'pending', the SNIU uses the release key pointer to fetch the saved certificate of the next SNIU, generates release key data (an MEK, RA, and IV), stores the wrapped MEK and IV in the Sym_Key Table entry, and changes the association type to 'sniu'. If the association type is 'NULL', the SNIU changes it to 'in'; otherwise, it is marked as 'both'.

Finally, the SNIU rebuilds the Association Grant Message to send on to the destination. The SNIU copies the received datagram up to and including the association key data and the certificate of the SNIU which originated the Association Grant Message, inserts its certificate and the release key data, and signs and sends the datagram.

Association Unknown—The SNIU verifies the signature on the message and releases the message out the opposite port.

Protected User Datagram—The SNIU uses the source IP address to find the appropriate entry in the receiving port's Association Table, fetches the release key, and verifies the release key residue. If the release residue is not correct the datagram is deleted and the event audited. Otherwise, the SNIU uses the destination IP address to find the appropriate entry in the opposite port's Association Table, fetches the release key, generates the new release residue, overwrites the old release residue, and sends the datagram on to the destination.

Receipt—The SNIU verifies the signature of the message and releases the message out the opposite port.

Certificate Revocation List—The SNIU verifies the signature on the message and releases the message out the opposite port.

Native Host Message—When a SNIU receives a user datagram from a native host, the SNIU creates an entry (if one doesn't already exist) in the receiving port's Association Table for the source host's IP, marks the association type as 'native host', sets the security level to the receiving port's security level, and checks the opposite port's Association Table for the destination's IP address.

If an entry does not already exist for the destination, the SNIU creates a new entry, marks the association type as 'pending', stores the received datagram in the Waiting Queue, makes a corresponding entry in the Schedule Table, creates an Association Request Message and sends it.

If an Association Table entry exists for the destination and the association type is 'pending', the SNIU stores the received datagram in the Waiting Queue, linking it to other datagrams for the same destination.

If an Association Table entry exists for the destination and the association type is 'host', the SNIU compares the source host's security level to the destination host's security level. If the source's security level is dominated by (i.e., less than or equal to) the destination, the SNIU creates a Protected User Datagram (PUD). The SNIU sets the destination to the peer SNIU's IP, sets the protocol type to indicate a SNIU Message, uses the association key to encrypt the entire received datagram, inserts the ciphatext and IV, appends the association residue, generates and inserts a release residue (if the Association Table entry contains a pointer to a release Key), appends the appropriate Dragonfly Message Flag, and sends the datagram. If the source host is not dominated by the destination (i.e., a potential write down), the SNIU determines if this datagram was anticipated. If a matching datagram was predicted the anticipated datagram is transformed into a PUD (as described above) and sent. If an anticipated message is not found, the attempted write-down is audited.

If an Association Table entry exists for the destination and the association type is any other bona fide type, i.e., 'native host', 'sniu', or 'audit catcher', the SNIU compares the source and destination port's security levels to determine if the datagram can be allowed to proceed. If the comparison indicates a write-up situation, the SNIU generates and saves an anticipated message and releases the original datagram to the destination port. If a write-down situation, the SNIU determines if the datagram was predicted and sends the anticipated message or audits as previously described. If a write-equal, the datagram is released to the destination port.

The SNIU may be implemented in the form of a software program executed on a general purpose computer coupled as a server between a host machine and the network. Alternatively, it may be programmed as a network communications program resident in and executed from the host machine. However, for security purposes, the preferred form of the SNIU is a closed module having the security program functions resident in ROM and executed by a dedicated microprocessor. The closed module can incorporate the communications link or modem to the network.

It is to be understood that the embodiments described herein are merely exemplary of the principles of the invention, and that a person skilled in the art may make many variations and modifications without departing from the spirit and scope of the invention. All such variations and modifications are intended to be included within the scope of the invention as defined in the appended claims.

What is claimed is:

1. A method for securing classified data residing with a user at a higher security classification level from covert transference with acknowledgment messages by said user at a higher security classification level for confirming data transfers across a computer network to a user at a lower security classification level, said method comprising the steps of:

sending data from said user at a lower security classification level with delivery information to said user at a higher security classification level;

predicting the user content of permissible acknowledgment messages supporting a legitimate transfer of said data from said user at a lower security classification level to said user at a higher security classification level; and, releasing the predicted acknowledgment messages from said user at a higher security classification level to said user at a lower security classification level when the predicted acknowledgment message is a predetermined match with the content of said permissible acknowledgment messages.

2. The method in accordance with claim 1, wherein said computer network communicates under a Transmission Control Protocol/Internet Protocol (TCP/IP).

3. The method in accordance with claim 1, wherein said acknowledgment messages are Internet Protocol based data transfer protocols acknowledging the transfer of data from said user at a lower security classification level to said user at a higher security classification level.

4. The method in accordance with claim 1, wherein said data is transferred under a trivial file transfer protocol (TFTP) requiring acknowledgment for each given block of data transferred.

5. The method in accordance with claim 1, wherein the exact content of each acknowledgment message generated at the higher classified security level is predicted based on said data transferred from said user at a lower classified security level.

6. The method in accordance with claim 1, wherein the acknowledgment message generated by said user at a higher security classification level is only released to said user at the lower security classification level if the data contents in the acknowledgment message is of a security classification level at least one of equal to and lower than the security classification level of the data transferred from the said user at a lower security classification level to said user at a higher security classification level upon which the acknowledged message contents were predicted.

7. The method in accordance with claim 1, wherein the data transfers from said user at a lower security classification level to said user at a higher security classification level are Internet Protocol (IP) datagrams that are unit packets of deterministic data and nondeterministic data including IP addresses.

8. The method in accordance with claim 7, wherein the deterministic portions of the data transfers are predicted and the non-deterministic portions identified.

9. The method in accordance with claim 8, wherein when the predicted message is received from said user at a higher security classification level, the non-deterministic portion is checked for proper format and inserted into the predicted message for transfer back to said user at a lower security classification level to confirm the data transfer originally from the lower side to the higher side.

10. The method in accordance with claim 9, wherein the number of non-deterministic bits in each conformation message are monitored.

11. The method in accordance with claim 10, wherein confirmation messages having a rate of non-deterministic bits exceeding a predetermined rate are discarded and not permitted to be sent back to said user at a lower security classification level.

12. A method for securing data with a user at a higher security classification level against covert transference in acknowledgment messages during communications with a user at a lower security classification level not permitted access to the data, said method comprising the steps of:

sending data by said user at a lower security classification level to said user at a higher security classification level;

predicting the content of permissible acknowledgment messages from said user at a higher security classification level to said user at a lower security classification level based only on information residing with said user at a lower security classification level; and, releasing said acknowledgment messages which have a predetermined match to said user content of permissible acknowledgment messages.

13. The method in accordance with claim 12, wherein said acknowledgment messages are Internet protocol (IP) feedback messages supporting a legitimate transfer of said data with said user at a lower security classification level to said user at a higher security classification level.

14. The method in accordance with claim 12, wherein the communications include a trivial file transfer protocol (TFTP) requiring an acknowledgment message for each given block of data transferred.

15. The method in accordance with claim 14, wherein the sequence and exact content of each said acknowledgment message generated with said user at a higher security classification level is determined based on the TFTP data packets originating from said user at a lower security classification level.

16. The method in accordance with claim 15, wherein the acknowledgment message generated with said user at a higher security classification level is only used to determine said step of releasing and not release in any part data at a security classification level higher than the security classification level of the data received from said user at a lower security classification level.

17. The method in accordance with claim 12, wherein said communications include Internet Protocol (IP) datagrams that include both deterministic and non-deterministic data.

18. The method in accordance with claim 17, wherein the non-deterministic data include IP addresses to be released from said user at a higher security level to said user at a lower security classification level.

19. The method in accordance with claim 18, wherein for a predicted said acknowledgment message generated by said user at a higher security classification level, the non-deterministic portion is checked for proper format.

20. The method in accordance with claim 19, wherein the step of releasing further includes monitoring the number of non-deterministic bits in each said acknowledgment message.

21. The method in accordance with claim 20, wherein the step of releasing is based on comparing the rate of non-deterministic bits monitored against a given rate.

22. The method in accordance with claim 17, wherein when the non-deterministic portion of said acknowledgment messages is an IP address, said method builds trust in the addresses through a chain of predicting and then verifying addresses and monitoring their use and change.

23. The method in accordance with claim 22, wherein building trust in IP addresses includes source and destination pairs going from said user at a lower security classification level to said user at a higher security classification level, said source and destination pairs being saved and used to predict destination and source addresses that would be a part of the predicted acknowledgment messages.

* * * * *

UNITED STATES PATENT AND TRADEMARK OFFICE
CERTIFICATE OF CORRECTION

Page 1 of 2

PATENT NO : 5,692,124
DATED : Nov. 25, 1997
INVENTOR(S): James M. Holden, Stephen E. Levin, Edwin H. Wrench, Jr.

It is certified that error appears in the above-identified patent and that said Letters Patent is hereby corrected as shown below:

In Column 24, line 46 cancel beginning with "7. The method in accordance with claim 1, wherein the data transfers" to and including "data including IP addresses." on line 51, and insert the following claim:

--7. The method in accordance with claim 1, wherein the acknowledgment messages for the data transfers from said user at a lower security classification level to said user at a higher security classification level are Internet Protocol (IP) datagrams that are unit packets of deterministic data and nondeterministic data including IP addresses.--

In Column 24, line 52 delete beginning with "8. The method in accordance with claim 7, wherein the deterministic portions" to and including "non-deterministic portions identified." on line 54, and insert the following claim:

--8. The method in accordance with claim 7, wherein the deterministic portion of the acknowledgment messages are predicted and the non-deterministic portions identified.--

In Column 24, line 65 delete beginning "11. The method in accordance with claim 10, wherein confirmation messages" to and including "classification level." in Column 25, line 2, and insert the following claim:

--11. The method in accordance with claim 10, wherein confirmation messages having a rate of non-deterministic bits exceeding a predetermined rate are not permitted to be sent back to said user at a lower security classification level.--

In Column 25, line 35 delete beginning "16. The method in accordance with claim 15, wherein the acknowledgment message" to

UNITED STATES PATENT AND TRADEMARK OFFICE
CERTIFICATE OF CORRECTION

PATENT NO : 5,692,124
DATED : Nov. 25, 1997
INVENTOR(S): James M. Holden, Stephen K. Levin, Edwin H. Wrench, Jr.

It is certified that error appears in the above-identified patent and that said Letters Patent is hereby corrected as shown below:

and including "at a lower security classification level." in Column 26, line 4, and insert the following claim:
    --16.   The method in accordance with claim 15, wherein the acknowledgment message generated with said user at a higher security classification level is used to determine whether the predicted user content is correct.--

Signed and Sealed this

Seventh Day of September, 1999

Attest:

Q. TODD DICKINSON

*Attesting Officer*    *Acting Commissioner of Patents and Trademarks*